Dec. 4, 1962 W. VOGT ETAL 3,067,241
PROCESS AND DEVICE FOR THE MANUFACTURE AND ISOLATION
OF ACRYLIC ACID ALKYL ESTERS
Filed April 13, 1960
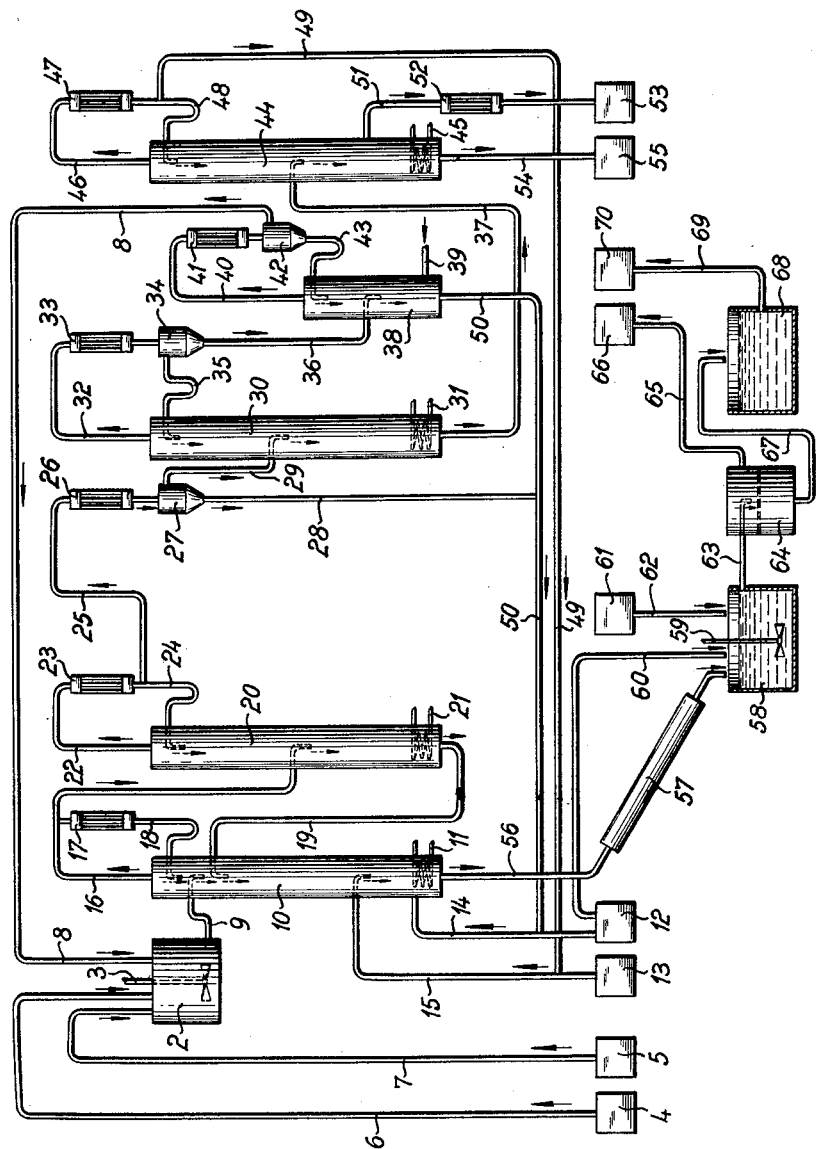
INVENTORS
Wilhelm Vogt,
Klaus Gehrmann,
Kurt Sennewald
BY
Connolly and Hutz
ATTORNEYS United States Patent Office 3,067,241
Patented Dec. 4, 1962

3,067,241
PROCESS AND DEVICE FOR THE MANUFACTURE AND ISOLATION OF ACRYLIC ACID ALKYL ESTERS
Wilhelm Vogt, Knapsack, near Koln, Klaus Gehrmann, Bonn (Rhine), and Kurt Sennewald, Knapsack, near Koln, Germany, assignors to Knapsack-Griesheim Aktiengesellschaft, Knapsack, near Koln, Germany, a corporation of Germany
Filed Apr. 13, 1960, Ser. No. 21,985
Claims priority, application Germany Apr. 24, 1959
10 Claims. (Cl. 260—486)

The present invention relates to a process for the manufacture and isolation of acrylic acid alkyl esters, more especially acrylic acid n-butyl ester, and to a device for carrying out said process.

It is known to hydrolyze acrylonitrile with sulfuric acid to obtain the sulfate of acryl amide and then to esterify the latter with an alcohol containing 1 to 8 carbon atoms, but no process has hitherto become known which describes the preparation of the corresponding pure esters and permits the production of these valuable products on an industrial scale.

The process and device of the present invention are concerned with the manufacture of pure acrylic acid n-butyl ester. The acrylic acid n-butyl ester obtained from the sulfate of acryl amide together with n-butanol and water is freed in three distilling columns, first from acrylic acid, then from water and finally from the unreacted n-butanol. As by-product ammonium bisulfate is obtained. The pure final product is obtained in a yield of over 90%, calculated on the acrylonitrile used as starting product.

The process of the invention comprises the following stages:

(1) The hydrolysis of acrylonitrile to obtain the sulfate of acryl amide,
(2) The esterification of the sulfate of acryl amide with n-butanol, for example,
(3) The purification of the acrylic acid ester, for example acrylic acid n-butyl ester, and
(4) The working up of the ammonium bisulfate obtained as by-product.

In the following, the individual stages of the process are illustrated with the aid of the accompanying flow chart and by the example of acrylic acid n-butyl ester.

(1) Hydrolysis of acrylonitrile to obtain the sulfate of acryl amide:

It is of advantage to use a sulfuric acid having as high a concentration as possible and containing approximately so much water as is required for the formation of the amide. For a complete conversion at least 1 mol $H_2SO_4$ is necessary per mol acrylonitrile. In practice, the required amount of sulfuric acid could not be reduced to less than 1.1 mol $H_2SO_4$ per mol acrylonitrile, which results in a sulfuric acid concentration of about 85%. The proportions by weight are, for example, 53 grams acrylonitrile per 107.8 grams sulfuric acid +19.8 grams $H_2O$. As compared therewith, the pertinent literature indicates 1.5 and more mols $H_2SO_4$ per mol acrylonitrile.

In order to avoid polymerization in the hydrolysis the sulfuric acid and the acrylonitrile must contain stabilizers. As stabilizer for the acrylonitrile about 0.25% by weight phenothiazine and as stabilizer for the sulfuric acid about 0.1% by weight methylene blue are used.

The acrylonitrile is conducted from reservoir 5 by way of conduit 7 and the sulfuric acid from reservoir 4 by way of conduit 6 into hydrolyzing vessel 2 provided with stirrer 3. In said stirring vessel the temperature is adjusted to about +90 to +100° C. by heating or eliminating the reaction heat. The time of stay, if desired in two vessels of this kind connected in series, is about 1 hour total. Under these conditions about 96–97% of the sulfate of acryl amide are obtained which can be determined by bromination. From the remaining 3–4% about 2% non hydrolyzed acrylonitrile can be recovered in the subsequent distillation of acrylic acid ester. A time of stay in the hydrolyzing vessel for more than 1 hour at 90–100° C. in order to increase the conversion easily involves polymerization. A rise in temperature above 100° C. is likewise disadvantageous.

Instead of in a single stirring vessel the hydrolysis may also be carried out in a circuit circulated by a pump, in which circuit the components are mixed and from which a substantial part of the reaction heat is eliminated by a cooler arranged, for example, between two interconnected stirring vessels. The circuit is then followed by a collection tank.

(2) Esterification of the sulfate of acryl amide with n-butanol:

The hydrolysing mixture is advantageously conducted by way of conduit 9 to the upper tray of an esterification column 10 consisting, for example, of 20 bubble trays. The alcohol, in this case n-butanol, travels from reservoir 13 by way of conduit 15 into the fourth tray above the still of column 10. The still heated by means of radiator 11 to about +170° C. is charged with water from reservoir 12 by way of conduit 14. The proportions of sulfate of acryl amide to n-butanol to water amount to about 1:2.5:10 mols, the proportions by weight being about 1:2.61:2.54.

The addition of water serves three purposes:

(a) The acrylic acid n-butyl ester formed in the esterification column 10 from the sulfate of acryl amide is distilled off together with the unreacted n-butanol in the form of a mixture boiling at +92° C. It has been observed that acrylic acid n-butyl ester and water form a binary mixture boiling at +95° C. of 64% by weight acrylic acid n-butyl ester and 36% by weight water, whereas the boiling point of the mixture of n-butanol and water (57.5% by weight butanol and 42.5% by weight water) indicated in literature is +92.7° C. A mixture of all three components boils at +92° C. Thus, the addition of water reduces the boiling point, whereby the danger of polymerization decreases.

(b) The presence of water furthermore reduces the addition of n-butanol to the double bond of the acrylic acid amide or the acrylic acid and the esters thereof with the formation of β-butoxypropionic acid or the corresponding ester. Said butoxy compounds can be decomposed again by a thermal treatment but only with poor yields in acrylic acid or the esters thereof. By the addition of water β-hydroxypropionic acid is formed which can be transformed much more easily into acrylic acid than the butoxy compound. The decomposition is brought about in the still of column 10 maintained at about 170° C. and is favoured by the reduction of the partial pressure by means of the steam formed (c) Finally the addition of water prevents the ammonium bisulfate from crystallizing out in column 10.

In the still of column 10 a mixture of ammonium bisulfate, excess sulfuric acid and about 2 to 5% by weight water is obtained which is contaminated with polymeric products of acrylic acid that are gradually transformed into a black carbonized product. The molten salt mass furthermore contains 0.2 to 1.2% by weight of carbon in the form of dissolved organic substances. The salt mixture is discharged without difficulty through an outlet 56 which is preferably heated.

The top product of the esterification column 10, a mixture of acrylic acid n-butyl ester, n-butanol and water, leaves the column, if desired by way of a reinforcing part and through head outlet 16. Said vapor contains the acrylic acid formed in the acrylic acid amide hydrolysis by means of water or by the re-decomposition of β-hydroxy-propionic acid. For the depletion of acrylic acid a reflux produced in a dephlegmator 17 is introduced at the top of the reinforcing part of column 10 by way of reflux conduit 18, the ratio of reflux to vaporous product being about 0.1 to 1. At the top or into the reinforcing part of column 10 1.5% by weight phenothiazine and 0.75% by weight methylene blue are introduced, calculated on the amount of acrylonitrile used as starting material. The stabilizers are preferably used in the form of a butanolic solution.

(3) Purification of acrylic acid n-butyl ester:

The vapor mixture composed of acrylic acid n-butyl ester, n-butanol, acrylic acid, water, small amounts of non-hydrolyzed acrylonitrile and traces of $SO_2$ and butylene, which leaves the column 10 through head outlet 16 is introduced approximately at the center of distilling column 20 provided with radiator 21. In column 20 acrylic acid is separated and obtained as sump product.

The reflux of the product leaving by way of head outlet 22 is produced in a dephlegmator 23 with reflux conduit 24. 2 to 3 parts of the product of organic phase and water phase are refluxed while 1 part of the product having the same composition is discharged by way of conduit 25. The discharged product is then completely condensed in condenser 26 and separated in separator 27 into 2 phases of which the lower aqueous phase is reconducted via conduits 28, 50 and 14 into the still of esterification column 10 while the organic phase discharged from separator 27 as overflow via conduit 29 is treated as described below.

The aqueous phase still containing n-butanol and a little acrylic ester may be freed from the organic products in an intercalated small stripping column (not shown) by means of steam. The steam leaving said small column and containing the organic products can then be reconducted into the still of esterification column 10, preferably in the vaporous state in order to avoid an enlargement of the expensive and corrosion resistant heating surface of said column 10.

For stabilization 0.75% by weight phenothiazine and 0.375% by weight methylene blue, dissolved in butanol and calculated on the acrylonitrile originally used, are introduced into the column 20.

The sump of the column 20 is heated to a temperature such that the reflux is evaporated. In the still an aqueous solution of acrylic acid of 30% strength by weight is obtained which is discharged through conduit 19 and reconducted into esterification column 10. When an esterification column composed of 20 bubble trays is used, the conduit 19 enters said column at about the 15th tray from below.

The mixture leaving column 20 (separation of acrylic acid) and consisting of acrylic acid n-butyl ester, n-butanol and small amounts of acrylonitrile and dissolved water flows via conduit 29 into the upper third of column 30 provided with radiator 31. The column 30 is heated in a manner such that a reflux ratio of organic phase to intake over conduit 29 of 0.6 to 1 is produced. The organic reflux phase is formed in a separator 34 wherein the product withdrawn via head outlet 32 from the column 30 and condensed in condensator 33 accumulates. The reflux flows from separator 34 to column 30 through overflow pipe 35. The entire amount of water of column 30 separates in separator 34 as the lower phase and is thus separated from the lighter organic phase. The non-hydrolyzed acrylonitrile, the dissolved portions of n-butanol and ester and the $SO_2$ formed in the esterification reaction and contained in the water are blown out with steam in a subsequent small stripping column 38 and reconducted via conduit 8 into the vessel of hydrolysis 2. For this purpose the aqueous phase from separator 34 is conducted via conduit 36 into the small column 38 provided with a lower steam inlet 39. The product leaving by way of head outlet 40 is condensed in condenser 41 and partially travels over separator 42 and reflux pipe 43 to the head of small column 38, while the upper organic phase which consists substantially of acrylonitrile is reconducted, as already mentioned, from separator 42 via conduit 8 into the vessel of hydrolysis. The water obtained in the sump of the small column 38 is reconducted by way of bottom outlet 50 and conduit 14 into the sump of the esterification column 10.

The column 30 is likewise charged with 0.75% by weight phenothiazine and 0.375% by weight methylene blue, calculated on the acrylonitrile originally used, the stabilizers being employed in the form of butanolic solutions.

From the still of dehydrating column 30 a mixture composed of acrylic acid n-butyl ester and n-butanol is discharged and then introduced via outlet 37 into the center of column 44 provided with radiator 45. In spite of the increased danger of polymerization said column 44 is preferably operated at atmospheric pressure since under these conditions the separation of n-butanol from acrylic acid n-butyl ester can be most favorably performed on an industrial scale. It is likewise possible, however, to operate under reduced pressure in the range from 200 mm. of mercury to atmospheric pressure. A separation under a pressure below about 200 mm. of mercury is not possible on account of the formation of azeotropes.

The n-butanol which mostly contains 0.5 to 2% by weight acrylic acid n-butyl ester is discharged as top product of column 44 via conduit 46, condensed in dephlegmator 47 and partially refluxed via reflux pipe 48 and partially reconducted through conduit 49 into esterification column 10, while the acrylic acid n-butyl ester is preferably drawn off in vapor state above the still of column 44 through outlet 51. After having been condensed in condenser 52, it travels into collecting vessel 53. In the still of column 44 accumulate after a longer period small amounts of higher boiling products and polymers in the form of a resinous sump product (about 1–2% by weight calculated on the yield of acrylic acid n-butyl ester). The resins are conducted into collecting vessel 55 by way of bottom outlet 54.

The last column 44 is charged at the head with 0.75% by weight phenothiazine and 0.375% by weight methylene blue in the form of butanolic solutions.

It is also possible to expel the acrylic acid n-butyl ester contained in the sump liquid of column 44 outside said column in a simple still, for example, and then to reconduct the distillate into column 44 containing the pure ester. The polymer obtained as a sticky resin should then be removed from the still, for example, with the aid of a dissolving, aromatic or aliphatic oil in order to cleanse the still.

(4) Working up of ammonium bisulfate obtained as byproduct:

The ammonium bisulfate obtained in the still of the esterification column 10 is contaminated with organic impurities such as acrylic acid, hydracrylic acid and stabilizer residues and it is therefore unsuitable for the manufacture of ammonium sulfate.

The molten salt mass is heated for about 10 minutes to a temperature of about 250° C. whereby the organic impurities are destroyed. The heating can be performed in a rotary kiln 57 which is charged with the salt mixture leaving esterification column 10 by way of bottom outlet 56. The salt is then dissolved in water in a vessel 58 provided with stirrer 59. In the heat a solution of 60–70% strength by weight can be obtained which, after having been treated with about 1% by weight of animal charcoal, calculated on the dissolved salt, yields a colorless filtrate. The water for dissolution is withdrawn via conduit 60 from reservoir 12 and the active carbon is withdrawn from reservoir 61 through conduit 62, and introduced into stirring vessel 58. The salt solution travels via outlet 63 into filtering unit 64 from which the charcoal residue is conducted through outlet 65 into reservoir 66 while the solution flows via conduit 67 into evaporator 68. Without treatment with charcoal the solution yields a yellowish filtrate while the solution decolorized with charcoal yields in the subsequent evaporation a white salt having an average content of about:

| | Percent by weight |
|---|---|
| $SO_4$ | 82–83 |
| $NH_3$ | 13.5–14.5 |
| $H_2O$ | 0.5–3.0 |
| C | 0.3 |

The yields of the process of the invention in the individual stages are:

| | Percent |
|---|---|
| Hydrolysis stage | 99 |
| Esterification stage | 94.5 |
| Distillation stage | 97.5 | which corresponds to a total yield of about 91% of pure acrylic acid n-butyl ester, calculated on the acrylonitrile originally used.

With slight modifications of the device the process of the invention may also be used for the manufacture of other pure esters, especially $C_3$ and $C_4$ acrylic acid esters so that it is not restricted to the manufacture of acrylic acid n-butyl ester.

More particularly, the process for the manufacture and isolation of acrylic acid alkyl esters, especially of acrylic acid n-butyl ester, according to the invention is carried out as follows:

The sulfate of acryl amide obtained by hydrolysis from acrylonitrile with sulfuric acid is conducted to an esterification stage, wherein for example n-butanol and water are contacted in a countercurrent with the sulfate of acryl amide to yield a molten salt mass of ammonium bisulfate as sump product while the acrylic acid n-butyl ester is withdrawn as top product together with the residual amounts of n-butanol, acrylic acid and water and freed in three distillation stages connected in series from acrylic acid, water and n-butanol. In the first distillation stage the aqueous acrylic acid is obtained as sump product and reconducted into the esterification stage, while at the head a ternary mixture of acrylic acid n-butyl ester, n-butanol and water is withdrawn which, after having been condensed, is separated into an aqueous phase, that is recycled into the sump of the esterification column, and an organic phase still containing dissolved water. Said organic phase is conducted to a second distillation stage where dehydration is brought about and from which the aqueous phase is withdrawn at the head while the acrylic acid n-butylester and the n-butanol are discharged from the sump and conducted to a third distillation stage for being separated into n-butanol, which is discharged at the head and recycled into the esterification column, higher boiling residues and pure acrylic acid n-butyl ester as final product. The aqueous phase withdrawn at the head of the second distillation stage and still containing acrylonitrile and n-butanol as dissolved impurities travels to a small water purification stage heated with steam, where the organic components are expelled and recycled to the hydrolysis stage, while the water is recycled to the esterification stage.

The pure acrylic acid n-butyl ester obtained in the third distillation stage is preferably drawn off in vaporous form above the distillation sump, subsequently condensed and collected. The esterification stage and the three distillation stages are heated and operated, as well as the water purification stage, with reflux.

According to a further embodiment of this invention the acrylonitrile is hydrolyzed while stirring at a temperature in the range of about 90 to 100° C. with sulfuric acid of approximately 85% strength, the molar ratio of said sulfuric acid to acrylonitrile being at least about 1.1 to 1 and the time of stay being about 1 hour. For stabilization the acrylonitrile is admixed with about 0.25% by weight phenothiazine and the sulfuric acid is admixed with about 0.1% by weight methylene blue. In the esterification stage a still temperature of about 170° C. and a molar ratio of sulfate of acryl amide:n-butanol: water of about 1:2.5:10 are maintained. For stabilization there are added at the top about 1.5% by weight phenothiazine and about 0.75% by weight methylene blue in the esterification stage and about 0.75% by weight phenothiazine and about 0.375% by weight methylene blue in the following three distillation stages, calculated on the acrylonitrile originally used.

It is of advantage to operate the individual stages at atmospheric pressure, but a somewhat reduced pressure may likewise be applied.

The molten salt mass discharged from the sump of the esterification stage and containing, in addition to 90% ammonium bisulfate, excess sulfuric acid, about 2 to 5% by weight water and organic impurities, is heated for about 10 minutes to about 250° C. whereby the impurities are destroyed, and then dissolved by being stirred into water while hot to yield an about 60 to 70% solution. After the addition of animal charcoal the solution is filtered and from the colorless filtrate the pure ammonium bisulfate is obtained by evaporation.

The following examples serve to illustrate the invention but they are not intended to limit it thereto.

*Example 1*

79.5 grams=1.5 mols acrylonitrile admixed with 0.2 gram phenothiazine and 191.4 grams=1.65 mols sulfuric acid of 85% strength admixed with 0.2 gram methylene blue were pumped continuously per hour into stirring and hydrolyzing vessel 2. At 100° C. hydrolysis was brought about for one hour. The conversion into the sulfate of acrylamide amounted to 97%. Since, however, the unreacted acrylonitrile which was recovered in the course of the process was recycled into the vessel 2 a total yield of 99% of the sulfate of acryl amide was obtained, calculated on the acrylonitrile used.

The hydrolysing mixture composed of acryl amide sulfate and 10% by weight sulfuric acid was introduced into esterification column 10 via conduit 9. Column 10 was a bubble tray column which was dimensioned so that the time of stay of the reaction mixture in said column, calculated on the sum of intakes and the reflux, amounted to about 1 hour. The still which was maintained at about 170° was charged per hour via conduit 15 with 277.5 grams=3.75 mols n-butanol and via conduit 14 with 270 grams=15 mols water. The top product of column 10 consisted of a mixture of acrylic acid n-butyl ester, n-butanol, water and small amounts of acrylic acid and had a boiling point of 92° C. In the dephlegmator 17 a reflux of 0.1:1 was produced. The contents of column 10 were stabilized per hour with 50 cc. of a solution of 0.1 gram phenothiazine and 0.05 gram methylene blue in butanol.

In column 20 which was charged with the top product of column 10 the acrylic acid was separated from the aforesaid ternary mixture at a reflux of 2:1 to 3:1 produced in dephlegmator 23. For stabilization the column 20 was charged per hour with 25 cc. of a solution of 0.05 g. phenothiazine and 0.025 gram methylene blue in butanol.

The acrylic acid was repumped as aqueous solution from the still of column 20 into esterification column 10. In condenser 26 the top product of column 20 which was substantially free from acrylic acid but still contained $SO_2$ was totally condensed and separated in separator 27 into two phases. The upper organic phase composed of acrylic acid n-butylester, n-butanol and about 13% by weight dissolved water was introduced into dehydration column 30, while the lower aqueous phase was recycled into the still of esterification column 10. For stabilization column 30 was charged per hour with 25 cc. of a butanolic solution of 0.05 gram phenothiazine and 0.025 gram methylene blue. At the head a ternary, mainly water-containing mixture distilled off which was completely condensed in condenser 33 and separated into two phases in separator 34. The upper organic phase was reconducted into column 30 at a reflux ratio of organic phase to intake into column 30 of 0.6:1.

The dehydrated mixture of acrylic acid n-butyl ester and n-butanol was discharged from the still of column 30 and pumped into column 44, into which 25 cc. of a butanolic solution of 0.05 gram phenothiazine and 0.025 gram methylene blue were introduced per hour for stabilization. At a reflux ratio of 3:1 the n-butanol was discharged at the head, condensed in condenser 47 and recycled, after the addition of 1.5 mols of fresh butanol into esterification column 10 by way of inlet 15. The pure ester was drawn off as vapor of column 44 through outlet 51, condensed in condenser 52 and conducted into collecting vessel 53. From the still of column 44 the polymer formed was removed through bottom outlet 54. The lower water phase of separator 34 was separated in column 38 from dissolved acrylonitrile and n-butanol by boiling and the acrylonitrile and n-butanol (top product) were recycled via conduit 8 into hydrolyzing vessel 2. The water removed at the bottom of column 38 and the lower water phase of separator 27 were recycled with the required amount of fresh water through conduit 14 into the still of esterification column 10.

The sump of column 10 consisting of 90% ammonium bisulfate, 5% sulfuric acid and 5% water which was contaminated with little polymer and dissolved organic products was discharged from the still via bottom outlet 56, conducted into a rotary kiln 57 and heated to 250° C. Thus the organic impurities were carbonized so that they could be filtered off. The product was then dissolved in stirring vessel 58 in the necessary amount of water, about 1% of active carbon was added for decolorizing the solution and the whole was filtered in filtering unit 64. The discharged solution was concentrated in evaporating tank 68 at 180° C. and cooled, and colorless ammonium bisulfate was obtained as valuable by-product.

90–92% of acrylic acid n-butyl ester were obtained, calculated on the acrylonitrile used.

*Example 2*

The manner of operation was the same as that described in Example 1, the operation period was 54 hours.

Charged:
    4,354 grams=82.2 mols acrylonitrile
    10,490 grams=90.2 mols $H_2SO_4$ (85%)
    15,200 grams=205 mols n-butanol
    14,796 grams=822 mols water
Discharged:
    9,610 grams=75 mols butyl ester The yield of acrylic acid n-butyl ester amounted to 91.25%, calculated on the acrylonitrile used.

*Example 3*

The manner of operation was the same as that described in Example 1, the operation period was 147 hours.

Charged:
    11,215 grams=211.6 mols acrylonitrile
    27,005 grams=232.8 mols $H_2SO_4$ (85%)
    39,146 grams=529 mols n-butanol
    38,088 grams=2116 mols water
Discharged:
    25,357 grams=198.1 mols butyl ester.

The yield of acrylic acid n-butyl ester amounted to 93.6%, calculated on the acrylonitrile originally used.

In the sump of the esterification column 32,000 grams of salt product containing 0.6% by weight acrylic acid were obtained, corresponding to 192 grams acrylic acid= 2.6 mols or a loss of 1.22%, calculated on the acylonitrile used.

We claim:

1. A process for the manufacture and isolation of acrylic acid n-butyl ester which comprises conducting a sulfate of acrylamide, obtained by hydrolyzing acrylonitrile with sulfuric acid, to an esterification stage, contacting said sulfate in a countercurrent with n-butanol and water at a temperature of about 170° C., wherein the molar ratio of acrylamide sulfate to n-butanol to water is about 1:2.5:10, obtaining as sump product of the esterification stage a molten salt mass of ammonium bisulfate, drawing off at the top of the esterification stage acrylic acid n-butylester, residual n-butanol, acrylic acid and water, obtaining in a first distillation stage of the top-product aqueous acrylic acid as sump product which is recycled into the esterification stage, a ternary mixture of acrylic acid n-butylester, n-butanol and water as top product which is separated after condensation into an aqueous phase which is recycled in the sump of the esterification column, and an organic phase which still contains dissolved water, conducting the organic phase to a second distillation stage connected in series with the first stage for dehydrating said organic phase, discharging the resultant aqueous phase at the head of the second distillation stage, discharging a mixture of acrylic acid n-butylester and n-butanol from the sump of the second distillation stage, and separating the latter mixture in a third distillation stage into n-butanol as top product which is recycled into the esterification stage, higher boiling residues and pure acrylic acid n-butyl ester as final product.

2. A process as claimed in claim 1, wherein the aqueous phase which is discharged at the head of the second distillation stage and which still contains impurities of acrylonitrile and dissolved n-butanol is conducted to a smaller steam-heated water purification stage where said organic components are expelled, and recycled to the hydrolysis stage while the water is recycled into the esterification stage.

3. A process as claimed in claim 1, wherein the pure acrylic acid n-butyl ester obtained in the third distillation stage in vaporous form is discharged above the distillation sump, then condensed and collected.

4. A process as claimed in claim 1, wherein the esterification stage and the three distillation stages are heated and operated under reflux as is the purification stage.

5. A process as claimed in claim 1, wherein the acrylonitrile is hydrolyzed while stirring at a temperature in the range from about 90 to 100° C. with sulfuric acid having a strength of about 85%, the molar ratio of sulfuric acid to acrylonitrile being at least about 1.1:1, and the time of stay being about 1 hour.

6. A process as claimed in claim 1, wherein the acrylonitrile is stabilized with about 0.25% by weight phenothiazine and the sulfuric acid is stabilized with about 0.1% by weight methylene blue.

7. A process as claimed in claim 1, wherein about 1.5% by weight phenothiazine and about 0.75% by weight methylene blue, calculated on the acrylonitrile, are introduced as stabilizers into the head of the esterification stage.

8. A process as claimed in claim 1, wherein about 0.75% by weight phenothiazine and about 0.375% methylene blue, calculated on the acrylonitrile, are introduced as stabilizers at the head into the three distillation stages.

9. A process as claimed in claim 1, wherein the individual stages are operated under atmospheric pressure.

10. A process as claimed in claim 1, wherein the molten salt mass discharged from the sump of the esterification stage and containing, besides about 90% by weight ammonium bisulfate, excess sulfuric acid, about 2–5% by weight water and organic impurities is heated for about 10 minutes to 250° C. whereby the impurities are destroyed, dissolved by being stirred into water while hot to yield an about 60–70% solution, the solution is admixed with animal charcoal and filtered, and the colorless filtrate is evaporated to obtain pure ammonium bisulfate.

References Cited in the file of this patent

UNITED STATES PATENTS

| | | |
|---|---|---|
| 2,526,310 | Wiley et al. | Oct. 17, 1950 |
| 2,666,782 | Brockway | Jan. 19, 1954 |
| 2,786,739 | Eck et al. | Mar. 26, 1957 |
| 2,822,348 | Haslam | Feb. 4, 1958 |
| 2,890,101 | Borrell et al. | June 9, 1959 |

UNITED STATES PATENT OFFICE
CERTIFICATE OF CORRECTION

Patent No. 3,067,241                          December 4, 1962

Wilhelm Vogt et al.

It is hereby certified that error appears in the above numbered patent requiring correction and that the said Letters Patent should read as corrected below.

Column 3, lines 9, 10, 43 and 44, column 4, lines 11, 12, 45 and 46, column 6, lines 8, 9, 10 and 11, and column 8, lines 62 and 67, for the "%", each occurrence read -- ‰ --; column 5, line 10, for "$SO_4$" read -- $SO_4^{--}$ --.

Signed and sealed this 20th day of August 1963.

(SEAL)
Attest:

ERNEST W. SWIDER                                DAVID L. LADD
Attesting Officer                                  Commissioner of Patents